United States Patent
Shi et al.

(10) Patent No.: US 8,989,110 B2
(45) Date of Patent: Mar. 24, 2015

(54) METHOD AND SYSTEM FOR TRANSMITTING MULTICARRIER-SUPPORTED CAPABILITY OF USER EQUIPMENT

(75) Inventors: Lirong Shi, Shenzhen (CN); Meifang He, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 159 days.

(21) Appl. No.: 13/258,298

(22) PCT Filed: Oct. 29, 2010

(86) PCT No.: PCT/CN2010/078250
§ 371 (c)(1), (2), (4) Date: Jul. 5, 2012

(87) PCT Pub. No.: WO2011/085608
PCT Pub. Date: Jul. 21, 2011

(65) Prior Publication Data
US 2012/0263122 A1    Oct. 18, 2012

(30) Foreign Application Priority Data
Jan. 15, 2010    (CN) .......................... 2010 1 0001243

(51) Int. Cl.
*H04W 4/00* (2009.01)
*H04W 8/24* (2009.01)
(Continued)

(52) U.S. Cl.
CPC .............. *H04W 8/24* (2013.01); *H04W 76/025* (2013.01); *H04L 5/001* (2013.01); *H04L 5/0098* (2013.01)
USPC ........................................................ 370/329

(58) Field of Classification Search
CPC .................................................... H04W 28/04
See application file for complete search history.

(56) References Cited

U.S. PATENT DOCUMENTS

2002/0071480 A1*  6/2002  Marjelund et al. ............ 375/141
2004/0071194 A1*  4/2004  Suwa et al. ................... 375/146
2004/0198369 A1* 10/2004  Kwak et al. ................ 455/452.2
(Continued)

FOREIGN PATENT DOCUMENTS

CN    1741674 A    3/2006
CN    1889751 A    1/2007
(Continued)

OTHER PUBLICATIONS

International Search Report in international application No. PCT/CN2010/078250, mailed on Feb. 24, 2011.
(Continued)

*Primary Examiner* — Chirag Shah
*Assistant Examiner* — Jael Ulysse
(74) *Attorney, Agent, or Firm* — Oppedahl Patent Law Firm LLC (57) ABSTRACT

The present disclosure provides a method for transmitting multicarrier-supported capability of UE. When the UE supports multicarrier, the UE sends a message carrying multicarrier-supported capability of the UE to an RNC; the RNC parses the message from the UE and obtains the multicarrier-supported capability of the UE. The present disclosure also provides a system for transmitting multicarrier-supported capability of UE. Through the method and the system of the present disclosure, a network side can learn that the UE supports multicarrier, and determine whether a service can be received by a multicarrier cell based on the learning.

6 Claims, 3 Drawing Sheets

(51) Int. Cl.
*H04W 76/02* (2009.01)
*H04L 5/00* (2006.01)

(56) References Cited

U.S. PATENT DOCUMENTS

| | | | | |
|---|---|---|---|---|
| 2006/0189272 | A1* | 8/2006 | Willenegger et al. | 455/3.01 |
| 2007/0127516 | A1* | 6/2007 | Czaja et al. | 370/445 |
| 2007/0264936 | A1* | 11/2007 | Kim et al. | 455/45 |
| 2008/0130556 | A1* | 6/2008 | Chang et al. | 370/329 |
| 2008/0165724 | A1* | 7/2008 | Wu et al. | 370/320 |
| 2008/0259863 | A1* | 10/2008 | Zhang et al. | 370/329 |
| 2009/0116468 | A1* | 5/2009 | Zhang et al. | 370/342 |
| 2009/0257387 | A1* | 10/2009 | Gholmieh et al. | 370/329 |
| 2010/0014467 | A1* | 1/2010 | Wang et al. | 370/329 |
| 2010/0202393 | A1* | 8/2010 | Zhang et al. | 370/329 |
| 2010/0227569 | A1* | 9/2010 | Bala et al. | 455/73 |
| 2010/0273520 | A1* | 10/2010 | Pelletier et al. | 455/522 |
| 2011/0021154 | A1* | 1/2011 | Marinier et al. | 455/67.11 |
| 2011/0103243 | A1* | 5/2011 | Larsson et al. | 370/252 |
| 2011/0103309 | A1* | 5/2011 | Wang et al. | 370/328 |
| 2011/0103323 | A1* | 5/2011 | Wang et al. | 370/329 |
| 2011/0170495 | A1* | 7/2011 | Earnshaw et al. | 370/329 |
| 2011/0243066 | A1* | 10/2011 | Nayeb Nazar et al. | 370/328 |
| 2012/0002630 | A1* | 1/2012 | Bergman et al. | 370/329 |
| 2012/0093103 | A1* | 4/2012 | Lee et al. | 370/329 |
| 2012/0099444 | A1* | 4/2012 | Hakola et al. | 370/248 |
| 2013/0016841 | A1* | 1/2013 | Fong et al. | 380/287 |
| 2013/0182685 | A1* | 7/2013 | Yu et al. | 370/336 |
| 2013/0188543 | A1* | 7/2013 | Dwyer et al. | 370/311 |

FOREIGN PATENT DOCUMENTS

| | | |
|---|---|---|
| CN | 101312551 A | 11/2008 |
| CN | 101345988 A | 1/2009 |
| CN | 101547515 A | 9/2009 |
| EP | 1916790 A1 | 4/2008 |
| KR | 20080019160 A | 3/2008 |
| KR | 20080025130 A | 3/2008 |
| KR | 20090017245 A | 2/2009 |
| WO | 2007000095 A1 | 1/2007 |
| WO | 2007116224 A1 | 10/2007 |
| WO | 2008136294 A1 | 11/2008 |
| WO | 2009117942 A1 | 10/2009 |

OTHER PUBLICATIONS

English Translation of the Written Opinion of the International Search Authority in international application No. PCT/CN2010/078250, mailed on Feb. 24, 2011.

3GPP TS 25.331 V.9.0.0; Sep. 30, 2009. (10 pages—see entire document).

Ericsson et al: "Dual band capability signalling", 3GPP Draft; R2-095715, 3rd Generation Partnership Project (3GPP), Mobile Competence Centre; 650, Route des Lucioles; F-06921 Sophia-Antipolis Cedex; France, no. Miyazaki; Oct. 6, 2009. (2 pages—See Supplementary European Search Report in European application No. 10842891.3 for relevant pages).

Ericsson: "Indication of Dual Cell capability in RRC Connection Request", 3GPP Draft; 25331__CR3516__(REL-8)__R2-087250; 3rd Generation Partnership Project (3GPP), Mobile Competence Centre; 650, Route des Lucioles; F-06921 Sophia-Antipolis Cedex; France, no. Prague, Czech Republic; Nov. 14, 2008. (8 pages—See Supplementary European Search Report in European application No. 10842891.3 for relevant pages).

ZTE: "UE indicates multi-carrier&MIMO info. in RRC Connection Request message", 3GPP Draft; R2-102543; rd Generation Partnership Project (3GPP), Mobile Competence Centre; 650, Route des Lucioles; F-06921 Sophia-Antipolis Cedex; France, vol. RAN WG2, no. Beijing, China; Apr. 15, 2010. (3 pages—See Supplementary European Search Report in European application No. 10842891.3 for relevant pages).

Noel F: "Higher Data Rates in GSM/EDGE with Multicarrier", Master's Thesis Chalmers University of Technology Goteborg, XX, XX; Apr. 1, 2001. (61 pages—See Supplementary European Search Report in European application No. 10842891.3 for relevant pages).

Supplementary European Search Report in European application No. 10842891.3, mailed on Jan. 22, 2014. (9 pages—see entire document).

* cited by examiner

METHOD AND SYSTEM FOR TRANSMITTING MULTICARRIER-SUPPORTED CAPABILITY OF USER EQUIPMENT

TECHNICAL FIELD

The present disclosure relates to a multicarrier technology in network communications, particularly to a method and a system for transmitting multicarrier-supported capability of User Equipment (UE).

BACKGROUND

High Speed Downlink Packet Access (HSDPA) is a technology proposed by the $3^{rd}$ Generation Partnership Project (3GPP) in Release-5, and is used for increasing a network data throughput in a downlink direction, namely, from a network side to a UE, wherein a downlink peak rate designed for the technology can reach 14.4 Mbps.

In a design of a physical layer, the HSDPA adopts a High Speed-Physical Downlink Shared Channel (HS-PDSCH) in a downlink direction to carry data of a High Speed-Downlink Shared Channel (HS-DSCH). Moreover, a High Speed-Shared Control Channel (HS-SCCH), which is transmitted before its corresponding HS-PDSCH, is used in the downlink direction for notifying UE of some necessary information about the HS-PDSCH transmitted after the HS-SCCH, such as a spreading code, a modulation method, the size of a transmission block, the process of a Hybrid Automatic Repeat Request (HARQ), a redundancy release, a new data indication, and a UE identifier which are used, so that the UE designated by the UE identifier can receive data transmitted by the HS-PDSCH correctly while other UE can not receive the data transmitted by the HS-PDSCH.

In an uplink direction, the HSDPA adopts a dedicated physical control channel for the HS-DSCH, namely a High Speed-Dedicated Physical Control Channel (HS-DPCCH). Through the HS-DPCCH, the UE feeds back to the network side that whether a transmission block in the HS-DSCH is received correctly or not, wherein ACK means correct reception, while NACK means incorrect reception, thus the corresponding data needs to be retransmitted, based on this the network side performs retransmission or transmits new data. Besides, the UE also feeds back a Channel Quality Indicator (CQI) table. The CQI table is predefined, and each CQI value corresponds to an HS-DSCH subframe in which the size of the transmission block, the quantity of HS-PDSCHs, and the modulation method are fixed. The UE should feed back a maximum CQI, which indicates that if the HS-DSCH subframe corresponding to the maximum CQI is received by the UE in one time slot prior to the moment when the HS-DPCCH subframe carrying the CQI starts transmitting, then error probability of the corresponding transmission block is not more than 10%, and this will be taken as a reference of radio channel quality of the UE.

In a design of an HS-DPCCH, HARQ-ACK information is carried by 10-bit data, and CQI information is carried by 20 bits. According to different capabilities, each UE belongs to a specific category (a UE category), the CQI table corresponding to the UE category contains 31 items which can be expressed by 5-bit data, and encoded into 20 bits and mapped in a CQI bit field of the HS-DPCCH. Two situations, i.e. ACK and NACK, may exist in an HARQ, which respectively indicate that a data block is received correctly and there is an error in the received data block. ACK or NACK is encoded into 10 bits through a specific code book, and then is mapped in an HARQ-ACK bit field of the HS-DPCCH.

Later, the 3GPP makes enhancement in several aspects based on the HSDPA. A Multiple-Input Multiple-Output (MIMO) antenna technology is one of the methods for improving the transmission bandwidth of a radio channel. The 3GPP adopts the MIMO technology in Rel-7 to ensure that at most two transmission blocks (a main transmission block and an auxiliary transmission block) are transmitted to one UE in a Transmission Time Interval (TTI) of 2 ms simultaneously. In order to support the MIMO technology, a sender needs to modulate data onto two incoherent antennae and transmit the data simultaneously, and a receiver also needs to receive the data from the two incoherent antennae simultaneously and demodulate the data. Similar to the HSDPA, the UE also needs to feed back HARQ-ACK and CQI after receiving HS-DSCH data. While different to the HSDPA, the UE needs to feed back HARQ-ACK for the two HS-DSCH transmission blocks respectively which are received simultaneously, and the CQI also aims at two spatial channels, and is marked as $CQI_1$ and $CQI_2$. Furthermore, UE also needs to feed back an antenna array weight, namely a precoding weight, required by a closed loop MIMO, so as to maximize the size of a transmission block. There are four precoding weights, namely $w_1$, $w_2$, $w_3$ and $w_4$; wherein $(w_1, w_2)$ constitute a main precoding vector for weighting data of a main transmission block, and $(w_3, w_4)$ constitute an auxiliary precoding vector for weighting data of an auxiliary transmission block. The main precoding vector is used for transmitting the main transmission block, and the auxiliary precoding vector is used for transmitting the auxiliary transmission block. In the four precoding weights, $w_1$ and $w_3$ are fixed values, and $w_2$ and $w_4$ have fixed symbol relation, therefore UE only needs to feed back the precoding weight $w_2$, which is realized through a Precoding Control Indicator (PCI). $w_2$ may be one of four values, so the PCI is 2-bit data. In case of MIMO, a new CQI table is used, and a CQI table corresponding to each specific UE category contains 15 items which are expressed by 4-bit data, so $CQI_1$ and $CQI_2$ need 8 bits in total. Therefore, the PCI and the CQI are 10-bit data after being combined together and are encoded into 20 bits to be mapped in a CQI/PCI bit field (namely the original CQI bit field) of the HS-DPCCH. An HARQ needs to consider the combination of six situations of ACK/NACK under conditions of single current and double current, and ACK/NACK is encoded into 10 bits through a specific code book to be mapped in an HARQ-ACK bit field of an HS-DPCCH.

The MIMO technology improves bandwidth by increasing the number of antennae at both the sender and the receiver. If the MIMO technology is not adopted, bandwidth can also be improved by a method of increasing carriers. In order to further improve the downlink bandwidth, the 3GPP introduces a Double Carrier HSDPA (DC-HSDPA) technology in Rel-8, and the downlink bandwidth is improved through two adjacent carriers (a main carrier and an auxiliary carrier). An HS-PDSCH and an HS-SCCH are both set for the main carrier and the auxiliary carrier, and the main carrier and the auxiliary carrier are scheduled independently. For a UE with the capability of receiving DC-HSDPA, HSDPA data can be received at both the main carrier and the auxiliary carrier. Similar to a single carrier HSDPA, the UE needs to feed back HARQ-ACK and CQI after receiving HS-DSCH data; while different to the single carrier HSDPA, the UE needs to feed back HARQ-ACK for the two HS-DSCH transmission blocks respectively which are received on two carriers simultaneously, and the CQI also aims at the two carriers, and is marked as $CQI_1$ and $CQI_2$. A CQI table corresponding to each CQI contains 31 items which can be expressed by 5-bit data, $CQI_1$ and $CQI_2$ are 10-bit data in total and are encoded into 20-bit data to be mapped in a CQI bit field of an HS-DPCCH. An HARQ needs to consider the combination of eight situations of ACK/NACK under the conditions of single carrier and multicarrier, and ACK/NACK is encoded into 10 bits through a specific code book to be mapped in an HARQ-ACK bit field of an HS-DPCCH.

In order to further improve the downlink bandwidth, the 3GPP combines the DC-HSDPA with the MIMO in Rel-9. In a design of an HS-DPCCH, based on an overall consideration of performance and power consumption, one HS-DPCCH is still adopted for information feedback. HARQ needs to consider the combination of forty-eight situations of ACK/NACK under the conditions of main carrier, auxiliary carrier, single current and multi-current, and ACK/NACK is encoded into 10 bits through a specific code book to be mapped in an HARQ-ACK bit field of the HS-DPCCH. A PCI needs to provide feedback with respect to the main carrier and the auxiliary carrier respectively, and is marked as $PCI_1$ and $PCI_2$ which are 4-bit data in total. A CQI is defined by using a MIMO CQI table of Rel-7; both $CQI_1$ and $CQI_2$ exist on each carrier and are 8-bit data; so the $CQI_1$ and $CQI_2$ existing on the main carrier and the auxiliary carrier are 16-bit data in total. Or, the CQI/PCI of the main carrier is 10-bit data, and the CQI/PCI of the auxiliary carrier is also 10-bit data. In HS-DPCCH transmission, the CQI/PCI of the main carrier is 10-bit data in total and is encoded into 20 bits to be mapped in a CQI/PCI bit field of a subframe in two continuous subframes of the HS-DPCCH; and the CQI/PCI of the auxiliary carrier is 10-bit data in total and is encoded into 20 bits to be mapped in a CQI/PCI bit field of another subframe in the two continuous subframes of the HS-DPCCH. That is to say, the CQI/PCI data of the main and the auxiliary carriers is transmitted on the HS-DPCCH in a time division multiplex manner.

In order to further improve the user peak rate, more carriers need to be combined together to be transmitted, for example, no less than four carriers (4C for short below) need to be combined together when MIMO data is transmitted at the bandwidth of 20 MHz, wherein each carrier can support HSDPA and MIMO. HARQ information that each carrier needs to feed back is one of the seven situations as follows: A, N, D, AA, AN, NA and NN. According to the existing transmission method of HARQ feedback information, the number of combination needing to be considered under the condition of four carriers is as follows: $7 \times 7 \times 7 \times 7 - 1 = 2400$, while a data field that carries the HARQ feedback information is 10 bits, which can feed back 1024 situations at most, therefore the feedback requirement of the HARQ information goes far beyond the carrying capacity of a 10-bit data field. Accordingly, a new HARQ transmission method is required to meet the transmission requirement of the HARQ information under the condition of four carriers where HSDPA is combined with MIMO, and the capability of UE also needs to be improved. Although a capability that UE supports double-carrier is introduced when double carriers are introduced into R8 protocol, for the condition of supporting four carriers, the capability that UE supports double-carrier can not express a capability that UE supports multicarrier; and the network side can not accurately learn that the UE can support multicarrier, so as not to allocate resources reasonably.

SUMMARY

In view of this, the main object of the present disclosure is to provide a method and a system for transmitting multicarrier-supported capability of UE, so that the network side can learn that the UE supports multicarrier, based on which the network side can determine whether a service can be received by a multicarrier cell, thereby allocating resources reasonably.

In order to achieve the purposes above, the technical solution of the present disclosure is realized as follows.

The present disclosure provides a method for transmitting multicarrier-supported capability of User Equipment (UE), including:

UE sends a message carrying multicarrier-supported capability of the UE to a Radio Network Controller (RNC) when the UE supports multicarrier; and the RNC parses the message from the UE and obtains the multicarrier-supported capability of the UE.

The step of sending, by the UE, the message carrying the multicarrier-supported capability of the UE to the RNC may include:

an indicator information element of the multicarrier-supported capability of the UE is added in a Radio Resource Control (RRC) connection request message; and the RRC connection request message carrying the indicator information element is sent to the RNC when the UE supports multicarrier.

The step of sending, by the UE, the message carrying the multicarrier-supported capability of the UE to the RNC may include:

a value of an information element of double carrier-supported capability of the UE in R8 protocol is expanded, wherein the expanded value is used for indicating a capability that how many multicarrier the UE supports; and an RRC connection request message carrying the expanded information element is sent to the RNC when the UE supports multicarrier.

The step of sending, by the UE, the message carrying the multicarrier-supported capability of the UE to the RNC may include:

a level of a High Speed-Downlink Shared Channel (HS-DSCH) physical layer category is expanded to add a level of the multicarrier-supported capability of the UE; and an RRC connection setup complete message or a UE capability information message carrying the expanded HS-DSCH physical layer category is sent to the RNC when the UE supports multicarrier.

The step of sending, by the UE, the message carrying the multicarrier-supported capability of the UE to the RNC may include:

the multicarrier-supported capability of the UE is indicated by using an access stratum release indicator information element together with an information element of double carrier-supported capability of the UE in R8 protocol; and an RRC connection request message carrying the access stratum release indicator information element and the information element of the double carrier-supported capability of the UE in R8 protocol is sent to the RNC when the UE supports multicarrier.

When a value of the access stratum release indicator information element is R8 and the RRC connection request message contains an information element indicating the UE supports double carriers in R8 protocol, it may be indicated that the UE supports downlink double carriers;

when the value of the access stratum release indicator information element is R10 and the RRC connection request message contains an information element indicating the UE supports double carriers in R8 protocol, it may be indicated that the UE supports downlink multicarrier as well as uplink double carriers, wherein a number of the downlink multicarrier is more than 2.

The method may further include:

after the RNC obtains the multicarrier-supported capability of the UE, the RNC decides that a service is received by a multicarrier cell, wherein the deciding may include:

the RNC makes auxiliary carrier cell information carried in a radio link setup request message or in a radio link reconfiguration request message which is sent to a NodeB, and makes the auxiliary carrier cell information carried in a radio bearer setup message or in a radio bearer reconfiguration message which is sent to the UE.

The RNC may decide, according to Quality of Service (QoS) attribute, the multicarrier-supported capability of the UE and cell capability, that the service is received by the multicarrier cell.

The present disclosure also provide a system for transmitting multicarrier-supported capability of UE, comprising UE and an RNC, wherein the UE is configured to send a message carrying multicarrier-supported capability of the UE to the RNC when the UE supports multicarrier;

the RNC is configured to parse the message from the UE and obtain the multicarrier-supported capability of the UE.

The UE may be further configured to add an indicator information element of the multicarrier-supported capability of the UE in an RRC connection request message; and to send the RRC connection request message carrying the indicator information element to the RNC when the UE supports multicarrier.

The UE may be further configured to expand a value of an information element of double carrier-supported capability of the UE in R8 protocol, wherein the expanded value is used for indicating a capability that how many multicarrier the UE supports; and to send an RRC connection request message carrying the expanded information element to the RNC when the UE supports multicarrier.

The UE may be further configured to expand a level of an HS-DSCH physical layer category to add a level of the multicarrier-supported capability of the UE; and to send an RRC connection setup complete message or a UE capability information message carrying the expanded HS-DSCH physical layer category to the RNC when the UE supports multicarrier.

The UE may be further configured to use both an access stratum release indicator information element and an information element of double carrier-supported capability of the UE in R8 protocol to indicate the multicarrier-supported capability of the UE; and to send an RRC connection request message carrying the access stratum release indicator information element and the information element of the double carrier-supported capability of the UE in R8 protocol to the RNC when the UE supports multicarrier.

When a value of the access stratum release indicator information element is R8 and the RRC connection request message contains an information element indicating the UE supports double carriers in R8 protocol, it may be indicated that the UE supports downlink double carriers;

when the value of the access stratum release indicator information element is R10 and the RRC connection request message contains an information element indicating the UE supports double carriers in R8 protocol, it may be indicated that the UE supports downlink multicarrier as well as uplink double carriers, wherein a number of the downlink multicarrier is more than 2.

The RNC may be further configured to decide that a service is received by a multicarrier cell after obtaining the multicarrier-supported capability of the UE, wherein the deciding may include:

auxiliary carrier cell information is carried, by the RNC, in a radio link setup request message or in a radio link reconfiguration request message which is sent to a NodeB, and the auxiliary carrier cell information is carried in a radio bearer setup message or in a radio bearer reconfiguration message which is sent to the UE.

The RNC may be further configured to decide, according to QoS attribute, the multicarrier-supported capability of the UE and cell capability, that the service is received by the multicarrier cell.

In the method and the system for transmitting multicarrier-supported capability of UE, when the UE supports multicarrier, the UE sends a message carrying multicarrier-supported capability of the UE to the RNC; and the RNC parses the message from the UE and obtains the multicarrier-supported capability of the UE. Through the present disclosure, a network side can learn that the UE supports multicarrier and determine whether a service can be received by a multicarrier cell based on the learning, thereby allocating resources reasonably.

DETAILED DESCRIPTION

The technical solution of the present disclosure is further illustrated below in details in combination with the accompanying drawings and specific embodiments.

In order to enable a network side to learn that the UE supports multicarrier and determine whether a service can be received by a multicarrier cell based on the learning so as to allocate resources reasonably, the present disclosure provides a method for transmitting multicarrier-supported capability of UE, the core concept thereof is that: when UE supports multicarrier, the UE sends a message carrying multicarrier-supported capability of the UE to the RNC (Radio Network Controller), wherein the message is an interactive message between the UE and the RNC; the RNC parses the interactive message from the UE and obtains the multicarrier-supported capability of the UE. Message interaction between the RNC and the UE are performed through a Uu interface, so that the message interacted between the RNC and the UE is also called as a Uu interface message. The multicarrier-supported capability of the UE lies in that the UE supports physical layer evolution after multicarrier is introduced, for example, the UE can demodulate HS-PDSCH information of a main carrier cell and a plurality of auxiliary carrier cells, and HARQ information may be fed back on the HS-PDSCH, and the like.

The multicarrier-supported capability of the UE may be sent in several ways which are listed but not limited to the followings:

1. an indicator information element of multicarrier-supported capability of UE is added in an RRC connection request message; when the UE supports multicarrier, the indicator information element is carried in the RRC connection request message which is sent to the RNC;

2. the value of an information element of double carrier-supported capability of the UE in R8 protocol is expanded, and the expanded value is used for indicating the capability that how many multicarrier the UE supports; when the UE supports multicarrier, the expanded information element is carried in the RRC connection request message which is sent to the RNC;

3. the level of an HS-DSCH physical layer category is expanded to add a level of multicarrier-supported capability of the UE; when the UE supports multicarrier, the expanded HS-DSCH physical layer category is carried in an RRC connection setup complete message or in a UE capability information message which is sent to the RNC; and 4. both an access stratum release indicator information element and an information element of double carrier-supported capability of UE in R8 protocol are used for indicating the multicarrier-supported capability of the UE; when the UE supports multicarrier, both the access stratum release indicator information element and the information element of the double carrier-supported capability of the UE in R8 protocol are carried in an RRC connection request message which is sent to the RNC. When a value of the access stratum release indicator information element is R8, and the RRC connection request message contains the information element of the double carrier-supported capability of the UE in R8 protocol, it indicates that the UE has the capability of supporting downlink double carriers; when a value of the access stratum release indicator information element is R10, and the RRC connection request message contains the information element of the double carrier-supported capability of the UE in R8 protocol, it indicates that the UE has the capability of supporting downlink multicarrier as well as uplink double carriers, wherein the number of the downlink multicarrier is more than 2.

The above method for transmitting multicarrier-supported capability of UE is further illustrated below in details in combination with specific embodiments.

In the first embodiment of the present disclosure, an indicator information element of multicarrier-supported capability of UE is added in an RRC connection request message and used for indicating the multicarrier-supported capability of the UE. The indicator information element may be a Multi Carrier Support information element, and the protocol thereof is described as shown in Table 1.

TABLE 1

| Information Element/Group name | Need | Multi | Type and reference |
|---|---|---|---|
| Multi Carrier Support | OP | | Enumerated (TRUE) |

Figure 1:
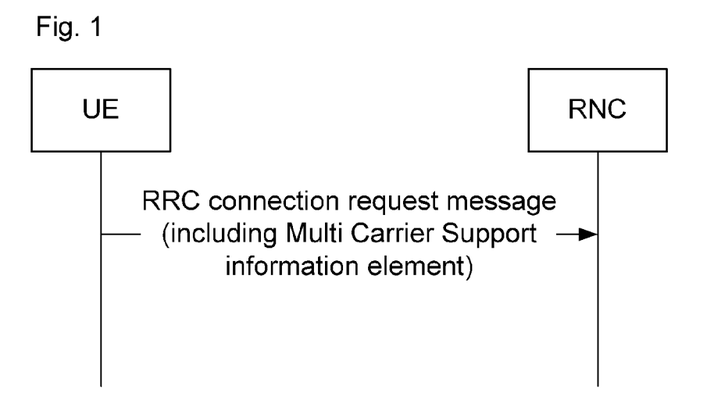
FIG. 1 shows a flow chart of a method for transmitting multicarrier-supported capability of UE in the first embodiment of the present disclosure.

As shown in FIG. 1, if UE has the multicarrier-supported capability, then the UE makes the Multi Carrier Support information element, the value of which is set to TRUE, contained in the RRC connection request message, and sends the RRC connection request message to the RNC; the RNC parses the received RRC connection request message and learns, according to the Multi Carrier Support information element in the message, that the UE supports multicarrier.

In the second embodiment of the present disclosure, the value of the Multi Cell Support information element in the RRC connection request message is expanded, and the multicarrier-supported capability of UE is indicated through the expanded value of the Multi Cell Support information element. The protocol of the Multi Cell Support information element is described as shown in Table 2.

TABLE 2

| Information Element/Group name | Need | Multi | Type and reference |
|---|---|---|---|
| Multi Cell Support | OP | | Enumerated (Dule, Three, Four, . . . ) |

Figure 2:
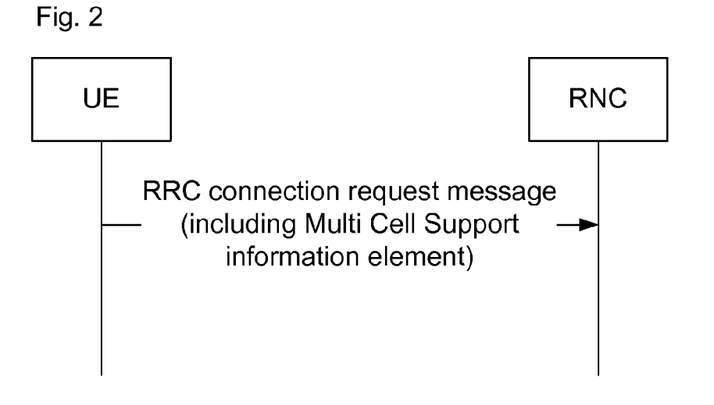
FIG. 2 shows a flow chart of a method for transmitting multicarrier-supported capability of UE in the second embodiment of the present disclosure.

As shown in FIG. 2, if UE has the multicarrier-supported capability, then the UE makes the Multi Cell Support information element contained in the RRC connection request message and sends the RRC connection request message to the RNC. If UE supports double carriers, then the value of the Multi Cell Support information element is set to Dule; if UE supports three carriers, then the value of the Multi Cell Support information element is set to three; and if UE supports four carriers, then the value of the Multi Cell Support information element is set to four. Accordingly, the multicarrier-supported capability of UE can be indicated through the expanded value of the Multi Cell Support information element. The RNC parses the received RRC connection request message and learns, according to the value of the Multi Cell Support information element in the message, that the UE supports multicarrier.

In the third embodiment of the present disclosure, both an access stratum release indicator information element and a Multi Cell Support information element in R8 protocol are used for indicating the multicarrier-supported capability of UE. The protocol of the Multi Cell Support information element and the access stratum release indicator information element is described as shown in Table 3.

TABLE 3

| Information Element/Group name | Need | Multi | Type and reference |
|---|---|---|---|
| Multi Cell support | OP | | Enumerated (TRUE) |
| Access stratum release indicator | MP | | Enumerated (REL-4, REL-5, REL-6, REL-7, REL-8, REL-9, REL-10) |

Figure 3:
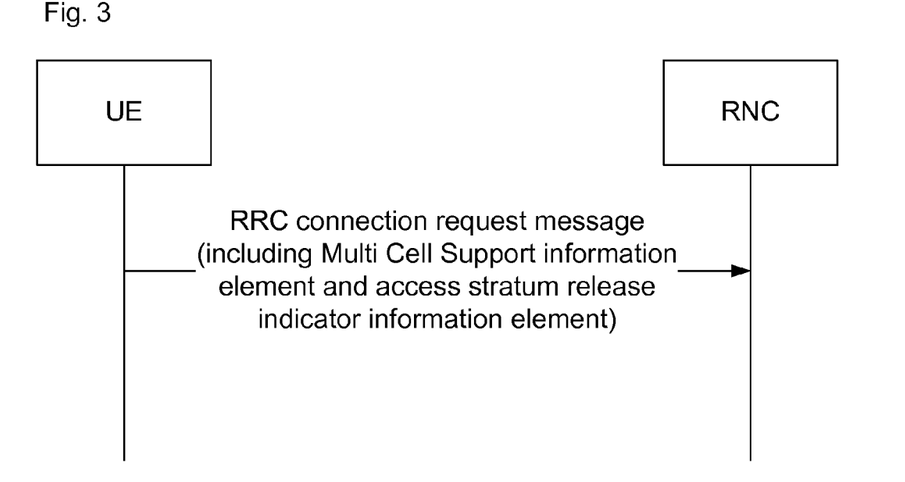
FIG. 3 shows a flow chart of a method for transmitting multicarrier-supported capability of UE in the third embodiment of the present disclosure.

As shown in FIG. 3, if UE has the multicarrier-supported capability, then the UE makes both the Multi Cell Support information element and the access stratum release indicator information element contained in the RRC connection request message, which is sent to the RNC by the UE. Specifically, if the value of the access stratum release indicator information element is REL-8, and the RRC connection request message contains a Multi Cell Support information element (of which the value is TRUE), then it indicates that the UE supports downlink double carriers; if the value of the access stratum release indicator information element is REL-10, and the RRC connection request message contains a Multi Cell Support information element (of which the value is TRUE), then it indicates that the UE supports downlink multicarrier as well as uplink double carriers, wherein the number of the downlink multicarrier is more than 2.

It should be explained that in the third embodiment of the present disclosure, if the RRC connection request message sent by the UE only contains the access stratum release indicator information element but no Multi Cell Support information element, then the RNC considers that the UE does not support multicarrier.

Figure 4:
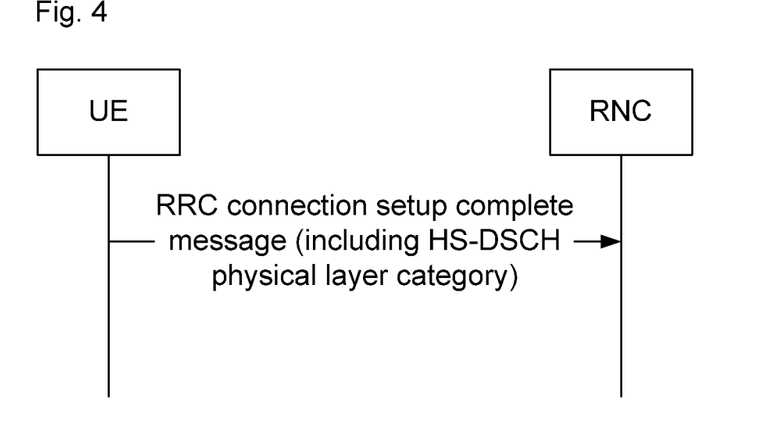
FIG. 4 shows a flow chart of a method for transmitting multicarrier-supported capability of UE in the fourth embodiment of the present disclosure.

In the fourth embodiment of the present disclosure, the level of an HS-DSCH physical layer category is expanded to add a level of multicarrier-supported capability of UE, such as a level of capability that the UE supports four multicarrier. As shown in FIG. 4, if UE has the multicarrier-supported capability, then the UE makes the expanded HS-DSCH physical layer category contained in an RRC connection setup complete message, which is sent to the RNC by the UE, wherein the expanded level of the HS-DSCH physical layer category is used for indicating the multicarrier-supported capability of the UE. The expanding of the HS-DSCH physical layer category refers to increasing the value of the category. In the current R9 protocol, the value of the category has been expanded to 28, so that the value of the category in the present disclosure may be set to larger than 28 to indicate the multicarrier-supported capability of UE.

Figure 5:
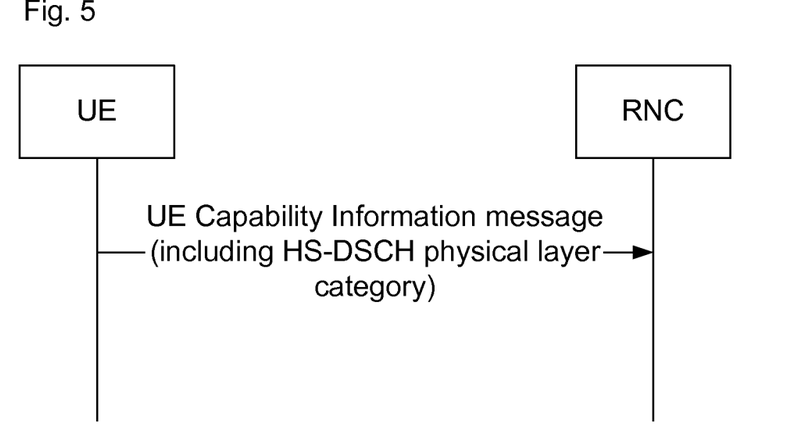
FIG. 5 shows a flow chart of a method for transmitting multicarrier-supported capability of UE in the fifth embodiment of the present disclosure.

In the fifth embodiment of the present disclosure, similarly, the level of the HS-DSCH physical layer category is expanded to add a level of the multicarrier-supported capability of UE. What is different from the fourth embodiment is that the multicarrier-supported capability of UE is notified to the RNC through a UE Capability Information message in the fifth embodiment. As shown in FIG. 5, if UE has the multicarrier-supported capability, then the UE makes the expanded HS-DSCH physical layer category contained in the UE Capability Information message, which is sent to the RNC by the UE, wherein the expanded level of the HS-DSCH physical layer category is used for indicating the multicarrier-supported capability of the UE. The specific indicating method is the same as that in the fourth embodiment, which is not repeated here.

Figure 6:
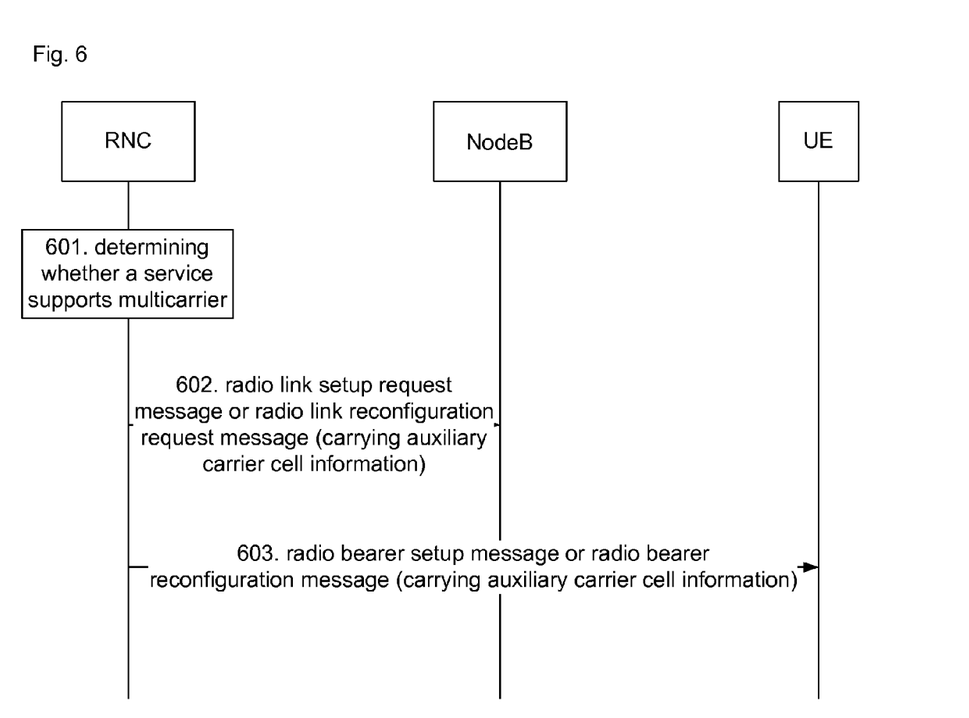
FIG. 6 shows a flow chart that an RNC decides, according to the multicarrier-supported capability of UE, that a service is received by a multicarrier cell in an embodiment of the present disclosure.

After the RNC obtains the multicarrier-supported capability of UE, the RNC can determine, according to the multicarrier-supported capability of UE, whether a service can be received by a multicarrier cell; the specific operating procedure is shown in FIG. 6 and mainly includes the following steps.

Step 601: the RNC determines, according to information such as Quality of Service (QoS) attribute, multicarrier-supported capability of UE, and cell capability, whether a service can be applied to multicarrier; Step 602 is executed when the service is determined to be multicarrier-supported.

The QoS attribute is transmitted to the RNC when a Core Network (CN) sends a service assignment, and the cell capability is obtained by the RNC through an audit response of NodeB.

Step 602: the RNC makes auxiliary carrier cell information carried in a radio link setup request message or in a radio link reconfiguration request message, and sends the message to the NodeB.

Step 603: the RNC makes the auxiliary carrier cell information carried in a radio bearer setup message or in a radio bearer reconfiguration message, and sends the message to the UE.

In order to implement the method for transmitting multicarrier-supported capability of UE, the present disclosure further provides a system for transmitting multicarrier-supported capability of UE, wherein the system includes UE and an RNC. The UE is configured to send a message carrying the multicarrier-supported capability of the UE to the RNC when the UE supports multicarrier; and the RNC is configured to parse the message from the UE and obtain the multicarrier-supported capability of the UE.

The multicarrier-supported capability of the UE may be sent in several ways which are listed but not limited to the followings:

1. an indicator information element of multicarrier-supported capability of UE is added in an RRC connection request message; when the UE supports multicarrier, the indicator information element is carried in the RRC connection request message and sent to the RNC;

2. the value of an information element of double carrier-supported capability of the UE in R8 protocol is expanded, and the expanded value is used for indicating the capability that how many multicarrier the UE supports; when the UE supports multicarrier, the expanded information element is carried in the RRC connection request message and sent to the RNC;

3. the level of an HS-DSCH physical layer category is expanded to add a level of multicarrier-supported capability of the UE; when the UE supports multicarrier, the expanded HS-DSCH physical layer category is carried in an RRC connection setup complete message or in a UE capability information message and sent to the RNC; and 4. both an access stratum release indicator information element and an information element of double carrier-supported capability of UE in R8 protocol are used for indicating the multicarrier-supported capability of the UE; when the UE supports multicarrier, both the access stratum release indicator information element and the information element of the double carrier-supported capability of the UE in R8 protocol are carried in an RRC connection request message and sent to the RNC. When a value of the access stratum release indicator information element is R8, and the RRC connection request message contains the information element of the double carrier-supported capability of the UE in R8 protocol, it indicates that the UE has the capability of supporting downlink double carriers; when a value of the access stratum release indicator information element is R10, and the RRC connection request message contains the information element of the double carrier-supported capability of the UE in R8 protocol, it indicates that the UE has the capability of supporting downlink multicarrier as well as uplink double carriers, wherein the number of the downlink multicarrier is more than 2.

Furthermore, the RNC is further configured to, after receiving the multicarrier-supported capability of the UE, determine whether a service can be received by a multicarrier cell according to QoS attribute, the multicarrier-supported capability of the UE and cell capability; wherein the determining specifically includes that:

when the RNC determines, according to the QoS attribute, the multicarrier-supported capability of UE and the cell capability, that the service supports multicarrier, the RNC makes auxiliary carrier cell information carried in a radio link setup request message or in a radio link reconfiguration request message which is sent to the NodeB by the RNC, and makes the auxiliary carrier cell information carried in a radio bearer setup message or a radio bearer reconfiguration message which is sent to the UE by the RNC.

In conclusion, through the method and the system provided by the present disclosure, the network side is enabled to learn that the UE supports multicarrier, and determine, according to the multicarrier-supported capability of UE, whether a service can be received by a multicarrier cell, thereby allocating resources reasonably.

The mentioned above are only preferred embodiments of the present disclosure but not limitation to the protection scope of the present disclosure.

The invention claimed is:

1. A method for transmitting multicarrier-supported capability of User Equipment (UE), comprising:
sending out, by UE, a message carrying multicarrier-supported capability of the UE, when the UE supports multicarrier;
parsing, by an Radio Network Controller (RNC), a message carrying multicarrier-supported capability of UE received from the UE; and
obtaining the multicarrier-supported capability of the UE; the method further comprises:
after the RNC obtains the multicarrier-supported capability of the UE,
deciding, by the RNC, that a service is received by a multicarrier cell, wherein the deciding comprises:
carrying, by the RNC, auxiliary carrier cell information in a radio link setup request message or in a radio link reconfiguration request message which is sent to a NodeB, and carrying the auxiliary carrier cell information in a radio bearer setup message or in a radio bearer reconfiguration message which is sent to the UE;
wherein the multicarrier-supported capability indicates the multicarrier-supported High Speed Downlink Packet Access (HSDPA) capability in a 3G system;
wherein the step of sending out, by the UE, the message carrying the multicarrier-supported capability of the UE comprises:
expanding a level of a High Speed-Downlink Shared Channel (HS-DSCH) physical layer category to add a level of the multicarrier supported capability of the UE; and
sending out an RRC connection setup complete message or a UE capability information message carrying the expanded HS-DSCH physical layer category when the UE supports multicarrier.

2. The method according to claim 1, wherein the RNC decides, according to Quality of Service (QoS) attribute, the multicarrier-supported capability of the UE and cell capability, that the service is received by the multicarrier cell.

3. A method for transmitting multicarrier-supported capability of User Equipment (UE), comprising:
sending out, by UE, a message carrying multicarrier-supported capability of the UE, when the UE supports multicarrier;
parsing, by an Radio Network Controller (RNC), a message carrying multicarrier-supported capability of UE received from the UE; and
obtaining the multicarrier-supported capability of the UE; the method further comprises:
after the RNC obtains the multicarrier-supported capability of the UE,
deciding, by the RNC, that a service is received by a multicarrier cell, wherein the deciding comprises;
carrying, by the RNC, auxiliary carrier cell information in a radio link setup request message or in a radio link reconfiguration request message which is sent to a NodeB, and carrying the auxiliary carrier cell information in a radio bearer setup message or in a radio bearer reconfiguration message which is sent to the UE;
wherein the multicarrier-supported capability indicates the multicarrier-supported High Speed Downlink Packet Access (HSDPA) capability in a 3G system;
wherein the step of sending out, by the UE, the message carrying the multicarrier-supported capability of the UE comprises:
expanding a value of an information element of double carrier-supported capability of the UE in R8 protocol, wherein the expanded value is used for indicating a capability that how many multicarrier the UE supports; and
sending out an RRC connection request message carrying the expanded information element when the UE supports multicarrier.

4. A system for transmitting multicarrier-supported capability of User Equipment (UE), comprising a UE and a Radio network Controller (RNC), wherein
the UE is configured to send out a message carrying multicarrier-supported capability of the UE when the UE supports multicarrier;
the RNC is configured to parse a message carrying multicarrier-supported capability of UE received from the UE and obtain the multicarrier-supported capability of the UE;
wherein the RNC is further configured to, after obtaining the multicarrier-supported capability of the UE, decide that a service is received by a multicarrier cell, wherein the deciding comprises:
auxiliary carrier cell information is carried, by the RNC, in a radio link setup request message or in a radio link reconfiguration request message which is sent to a NodeB, and the auxiliary carrier cell information is carried in a radio bearer setup message or in a radio bearer reconfiguration message which is sent to the UE;
wherein the multicarrier-supported capability indicates the multicarrier-supported High Speed Downlink Packet Access (HSDPA) capability in a 3G system;
wherein the UE is further configured to expand a level of an HS-DSCH physical layer category to add a level of the multicarrier-supported capability of the UE; and to send out an RRC connection setup complete message or a UE capability information message carrying the expanded HS-DSCH physical layer category when the UE supports multicarrier.

5. The system according to claim 4, wherein the RNC is further configured to decide, according to QoS attribute, the multicarrier-supported capability of the UE and cell capability, that the service is received by the multicarrier cell.

6. A system for transmitting multicarrier-supported capability of User Equipment (UE), comprising a UE and a Radio Network Controller (RNC), wherein
the UE is configured to send out a message carrying multicarrier-supported capability of the UE when the UE supports multicarrier;
the RNC is configured to parse a message carrying multicarrier-supported capability of the UE received from the UE and obtain the multicarrier-supported capability of the UE;
wherein the RNC is further configured to, after obtaining the multicarrier-supported capability of the UE, decide that a service is received by a multicarrier cell, wherein the deciding comprises:
auxiliary carrier cell information is carrier, by the RNC, in a radio link setup request message or in a radio link reconfiguration request message which is sent to a NodeB, and the auxiliary carrier cell information is carrier in a radio bearer setup message or in a radio bearer reconfiguration message which is sent to the UE;

wherein the multicarrier-supported capability indicates the multicarrier-supported High Speed Downlink Packet Access (HSDPA) capability in a 3G system;
wherein the UE is further configured to expand a value of an information element of double carrier-supported capability of the UE in R8 protocol, wherein the expanded value is used for indicating a capability that how many multicarrier the UE supports; and to send out an RRC connection request message carrying the expanded information element when the UE supports multicarrier.

* * * * *